US011870565B2

(12) United States Patent
Pedersen et al.

(10) Patent No.: US 11,870,565 B2
(45) Date of Patent: Jan. 9, 2024

(54) TRANSPORT BLOCK SIZE DRIVEN CQI FEEDBACK SCHEME

(71) Applicant: Nokia Technologies Oy, Espoo (FI)

(72) Inventors: Klaus Pedersen, Aalborg (DK); Lauri Kuru, Espoo (FI); Guillermo Pocovi, Aalborg (DK); Keeth Saliya Jayasinghe, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 78 days.

(21) Appl. No.: 17/379,736

(22) Filed: Jul. 19, 2021

(65) Prior Publication Data

US 2022/0045783 A1 Feb. 10, 2022

Related U.S. Application Data

(60) Provisional application No. 62/706,310, filed on Aug. 7, 2020.

(51) Int. Cl.
H04W 24/10 (2009.01)
H04L 1/00 (2006.01)
H04W 72/54 (2023.01)

(52) U.S. Cl.
CPC .......... H04L 1/0003 (2013.01); H04L 1/0009 (2013.01); H04L 1/0026 (2013.01); H04W 24/10 (2013.01); H04W 72/54 (2023.01)

(58) Field of Classification Search
CPC ... H04L 1/0003; H04L 1/0009; H04L 1/0026; H04W 24/10; H04W 72/08

(Continued)

(56) References Cited

U.S. PATENT DOCUMENTS

2015/0358924 A1* 12/2015 Papasakellariou .... H04W 52/34
370/329
2019/0053084 A1 2/2019 Hosseini et al.
(Continued)

OTHER PUBLICATIONS

Extended European Search Report received for corresponding European Patent Application No. 21189343.3, dated Dec. 23, 2021, 11 pages.

(Continued)

Primary Examiner — Christopher R Crompton
(74) Attorney, Agent, or Firm — Robert P. Michal, Esq.; Carter, DeLuca & Farrell LLP

(57) ABSTRACT

A method, apparatus, and a computer-readable storage medium are provided for radio link adaptation. In an example implementation, the method may include a user equipment receiving a channel quality report configuration from a network node, the channel quality report configuration including a first transport block size. The method may further include determining a channel quality indicator based at least on the first transport block size and transmitting the channel quality indicator to the network node. In another example implementation, the method may include a network node determining a first transport block size, the first transport block size being a target transport block size, and transmitting a channel quality report configuration to a user equipment, the channel quality report configuration including the first transport block size. The method may further include receiving a channel quality indicator from the user equipment, the channel quality indicator determined at the user equipment based at least on the first transport block size transmitted from the network node.

19 Claims, 7 Drawing Sheets

(58) Field of Classification Search
USPC .......................................................... 370/329
See application file for complete search history.

(56) References Cited

U.S. PATENT DOCUMENTS

2020/0077414 A1* 3/2020 Ye .......................... H04L 1/0013
2021/0013995 A1* 1/2021 Chen ..................... H04L 1/0026

OTHER PUBLICATIONS

"Considerations on CQI /MCS table(s) and related aspects for URLLC", 3GPP TSG RAN WG1 Meeting #92bis, R1-1805515, Agenda: 7.2.1, ZTE, Apr. 16-20, 2018, pp. 1-21.
"CSI definition for Rel-13 MTC", 3GPP TSG-RAN WG1 Meeting #83, R1-157386, Agenda: 6.2.1.8, MediaTek Inc, Nov. 15-22, 2015, 4 pages.
"3rd Generation Partnership Project; Technical Specification Group Radio Access Network; NR; Physical layer procedures for data (Release 16)", 3GPP TS 38.214, V16.1.0, Mar. 2020, pp. 1-151.
"3rd Generation Partnership Project; Technical Specification Group Radio Access Network; NR; Physical channels and modulation (Release 16)", 3GPP TS 38.211, V16.1.0, Mar. 2020, pp. 1-130.
"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.
"Performance Evaluation of LDPC Codes for NR eMBB Data", 3GPP TSG RAN WG1 Meeting #90, R1-1713740, Agenda : 6.1.4.1.6, Huawei, Aug. 21-25, 2017, 13 pages.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
"New WID on Enhanced Industrial Internet of Things (IOT) and URLLC support", 3GPP TSG RAN Meeting #86, RP-193233, Agenda : 9.1.2, Nokia, Dec. 9-12, 2019, 5 pages.
"3rd Generation Partnership Project; Technical Specification Group Radio Access Network; NR; Requirements for support of radio resource management (Release 16)", 3GPP TS 38.133, V16.3.0, Mar. 2020, 1169 pages.
"3rd Generation Partnership Project; Technical Specification Group Radio Access Network; NR; Physical layer procedures for control (Release 16)", 3GPP TS 38.213, V16.1.0, Mar. 2020, pp. 1-156.
Elgendi et al., "Interference Measurement Methods in 5G NR: Principles and Performance", 16th International Symposium on Wireless Communication Systems (ISWCS), Aug. 27-30, 2019, pp. 233-238.

* cited by examiner

| CQI_PRB_Index | NumberOfPRBs |
|---|---|
| 0 | 2 |
| 1 | 4 |
| 2 | 8 |
| 3 | 12 |
| 4 | 16 |
| 5 | 24 |
| 6 | 32 |
| 7 | 48 |

TRANSPORT BLOCK SIZE DRIVEN CQI FEEDBACK SCHEME

CROSS-REFERENCE TO RELATED APPLICATIONS

This application claims priority to U.S. Provisional Patent Application No. 62/706,310, filed Aug. 7, 2020, entitled "TRANSPORT BLOCK SIZE DRIVEN CQI FEEDBACK SCHEME," which is hereby incorporated by reference in its entirety.

TECHNICAL FIELD

This description relates to wireless communications, and in particular, radio link adaptation.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra reliable low latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for radio link adaptation. In an example implementation, the method may include a user equipment receiving a channel quality report configuration from a network node, the channel quality report configuration including a first transport block size. The method may further include determining a channel quality indicator based at least on the first transport block size; and transmitting the channel quality indicator to the network node.

In another example implementation, the method may include a network node determining a first transport block size, the first transport block size being a target transport block size. The method may further include transmitting a channel quality report configuration to a user equipment, the channel quality report configuration including the first transport block size; and receiving a channel quality indicator from the user equipment, the channel quality indicator determined at the user equipment based at least on the first transport block size transmitted from the network node.

DETAILED DESCRIPTION

Figure 1:
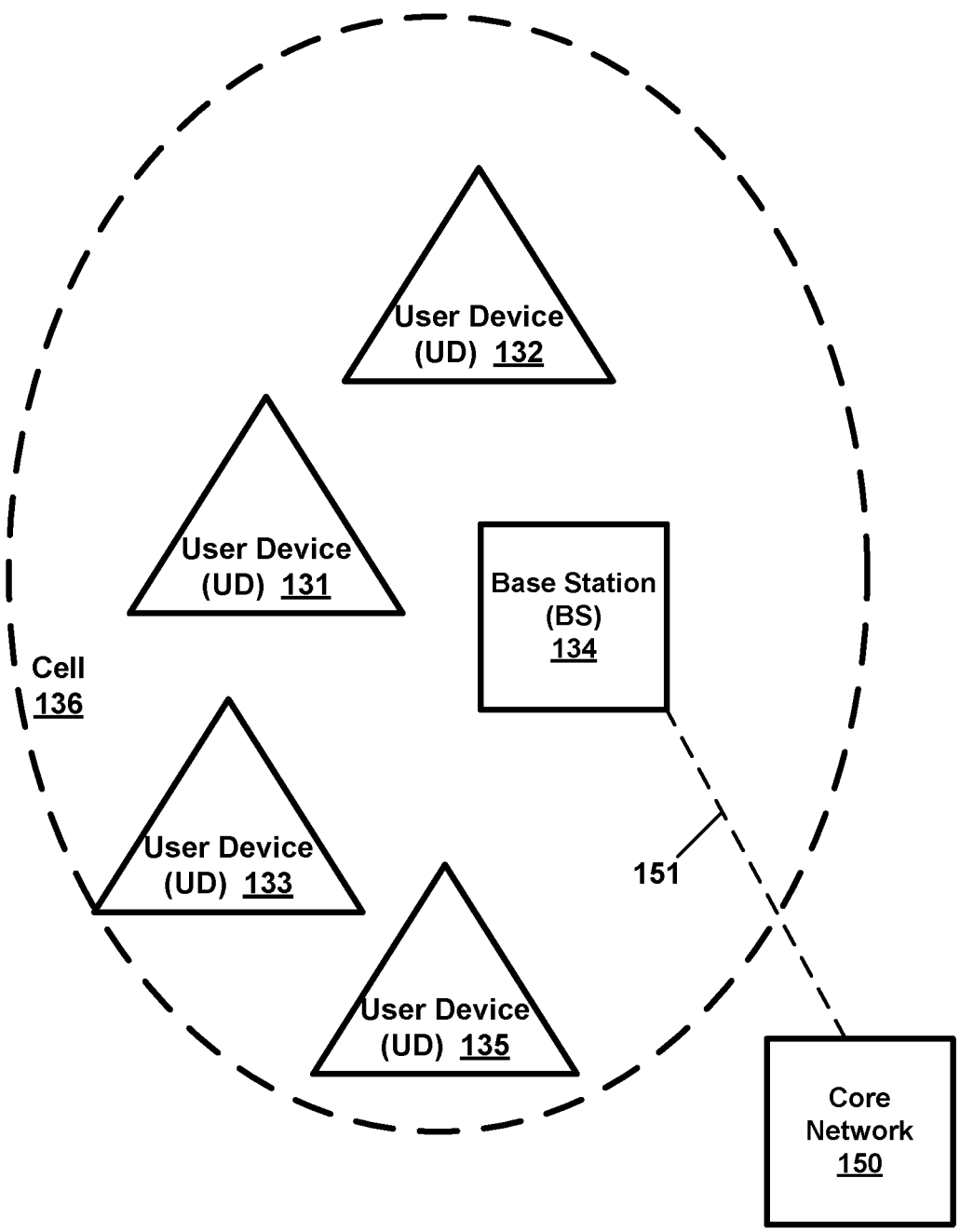
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error ratio than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In wireless communications, smaller payload sizes (e.g., 20-200 bytes) are generally more susceptible to errors due to, for example, lower coding gain, as compared to large payload sizes. For instance, under certain signal to noise ratio (SNR) or signal to interference and noise ratio (SINR) conditions, the error probability related to the transmission of a 20-byte payload is significantly larger than the error probability for a 1000-byte payload as illustrated in, for example, TDoc [R1-1713740], which contains a large set of low density parity check (LDPC) additive white Gaussian noise (AWGN) link-level block error ratio (BLER) curves for different block lengths and modulation and coding schemes (MCSs). In addition to forward error correction (FEC) efficiency as a function of a payload size, transmission of larger payloads over higher bandwidths (e.g., higher number of physical resource blocks (PRBs)) vs transmission of smaller payloads over few PRBs impacts the experienced frequency diversity, and thus the effective experienced SINR at the UE, which influences the performance at a user equipment.

In LTE/NR, the data from an upper layer provided to a physical layer may be referred to a transport block (TB) and a size of the TB is referred to as a transport block size (TBS). The TBS may be generally determined based on a number of (or set of) physical resource blocks (PRBs) and modulation and coding scheme (MCS). The MCS depends on radio link quality and can be defined as a number of useful bits that the can transmitted per resource element (RE). A channel quality indicator (CQI) is reported by a UE to a gNB and indicates the highest MCS at which the target block error ratio (target BLER/BLER target) is satisfied. The BLER can be defined as a ratio of the number of erroneous blocks received to the total number of blocks sent. An erroneous block is defined as a TB for which the cyclic redundancy check (CRC) has failed. The CQI may have values of 0-15 and reported periodically/aperiodically to the gNB.

The TBS associated with a CQI/CQI report from the UE is a function of the indicated MCS in the CQI and the size of the CSI reference resource (CSI_RR). A CSI reference resource has a fixed size in time and has a bandwidth (in frequency) as configured for the corresponding CQI report. Further, the target BLER associated with the CQI, e.g., 1E-1 or 1E-5, can be fulfilled if the gNB schedules a TB on a set of PRBs corresponding to the CSI reference resource and with the MCS reported in the CQI. For scheduling other payload sizes, especially smaller payload sizes not occupying the entire CSI reference resource, as defined above, some extrapolation of the MCS may be required at the gNB to compensate for lower coding gain and/or reduced frequency diversity. This extrapolation is prone to errors and may impact packet error probability as the gNB may be unaware of the UE channel characteristics, e.g., fading profile, SINR variance, etc. Thus, the associated payload size varies according to the UE reported CQI which varies according to UE's channel conditions. In other words, it may not be possible with current 3GPP Specifications to fix the associated payload size to a certain value.

The size of the CSI reference resource may be reduced by configuring subband CQI reporting, where the subband size may be as short as 4 PRBs (for bandwidth parts of size between 24 to 72 PRBs, see TS 38.214 Sec. 5.2.1.4), but this approach has several drawbacks: i) a CQI needs to be reported per subband which increases the feedback overhead; ii) the exact TB size associated with the CQI report still depends on the reported CQI index (e.g., not fixed); iii) even with 4-PRB subband, the associated TB size is generally large for IIoT applications, for example, for a UE with a relatively good channel quality (e.g., CQI corresponding to 16 QAM ½=2 bits/RE), the TB size associated to the CQI report is: 4[PRBs]*12[REs/PRB]*(14-3[symbols/PRB])*(2 [bits/RE])=1056 bits. This is still around 5-10 times larger than typical URLLC/TSC payload sizes.

Therefore, there is a desire and/or need to facilitate accurate link adaptation for the downlink using channel quality information reported by the UE when the transmission payload size is known or approximately known in advance and/or when the payload size is small, for example, less than 200 bytes.

In an example implementation, the present disclosure describes a mechanism that decouples the payload size (e.g., TBS) associated with a CSI reference resource from CQI (or CQI index) calculation. This may be achieved by the gNB signaling a target TBS as part of the CSI/CQI report configuration (e.g., CSI-ReportConfig RRC parameter in NR, TS 38.331) which is used by the UE to determine "channel quality information" reported to the gNB. It should be noted that, in the present disclosure, channel quality information refers not only to CQI (e.g., MCS, spectral efficiency (SE), recommendation from the UE) but also to other forms of feedback as further described below. In addition, in some implementations, the gNB may configure the definition of a CSI reference resource (or re-define/re-configure a CSI reference resource) to allow at least a configurable duration (e.g., instead of being fixed to full slot of 14 symbols as defined in 3GPP Specification), for example, corresponding to a short transmission time interval allocation of a mini-slot of 2 or 4 symbols, more appropriate for URLLC and/or TSC, or other similar types of communications.

In an example implementation, the present disclosure describes a link adaptation mechanism which may include a UE receiving a channel quality report configuration from a network node, the channel quality report configuration including a first transport block size; determining a channel quality indicator based at least on the first transport block size; and transmitting the channel quality indicator to the network node.

In another example implementation, the present disclosure describes a link adaptation mechanism which may include a network node (e.g., gNB) determining a first transport block size, the first transport block size being a target transport block size; transmitting, by the network node, a channel quality report configuration to a user equipment, the channel quality report configuration including the first transport block size; and receiving, by the network node, a channel quality indicator from the user equipment, the channel quality indicator determined at the user equipment based at least on the first transport block size transmitted from the network node.

Figure 2:
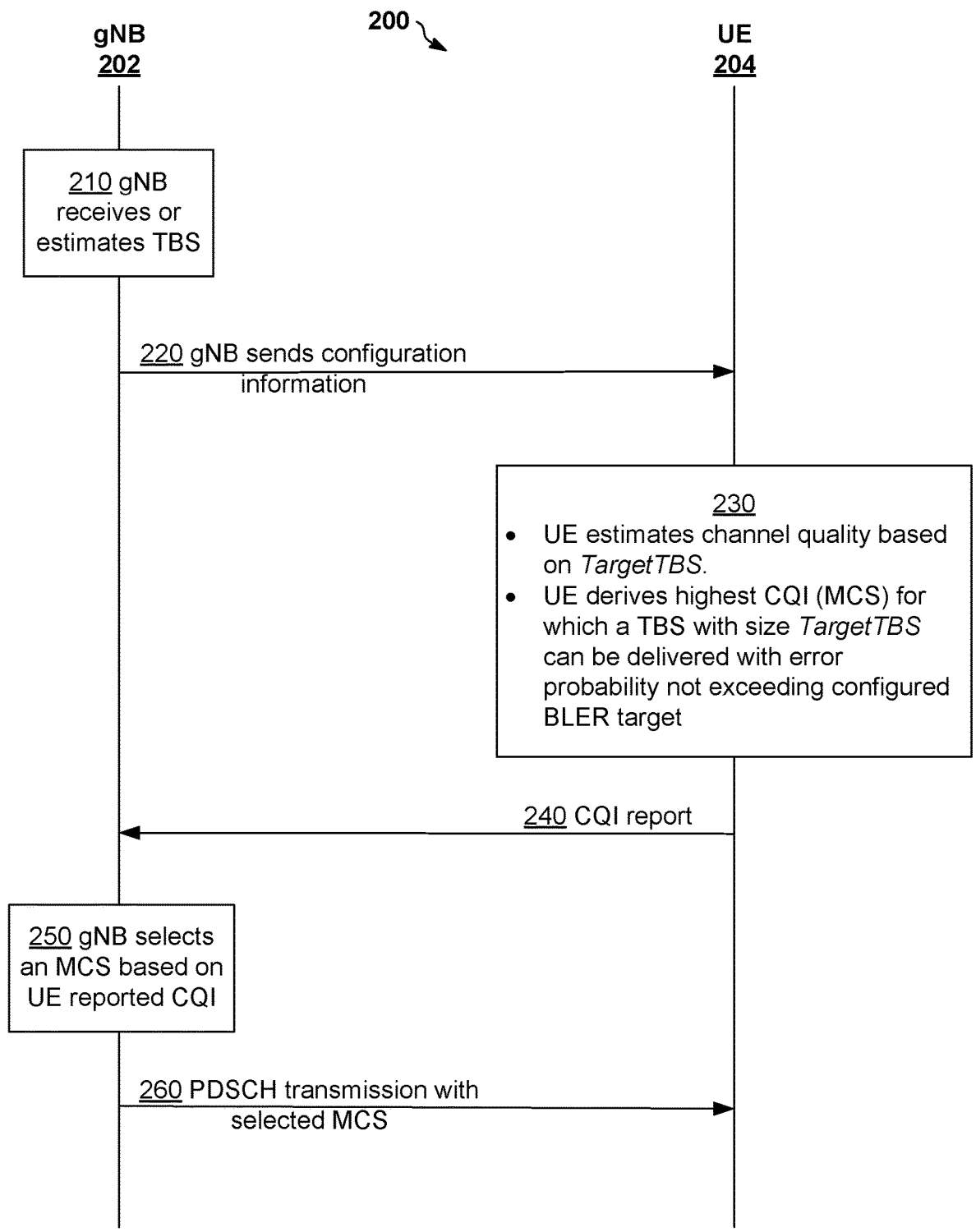
FIGS. 2-3 illustrate flow charts for CQI reports with fixed target TBSs, according to example implementations.

FIG. 2 illustrates a link adaptation mechanism 200, according to an example implementation.

In an example implementation, at 210, a gNB, e.g., gNB 202, which may be same as or similar to BS 134 of FIG. 1, may have knowledge of a payload size or transport block size (TBS) or may estimate the TBS for downlink communications with a UE, e.g., UE 204, which may be same or similar to user device 131 of FIG. 1. The gNB may receive the TBS for the UE from the core network or estimate it by other means, and hereafter referred to as TargetTBS in the present disclosure. In some implementations, for example, the payload sizes for DL and/or UL transmissions of TSC and/or URLLC (also referred to as Industrial Internet of Things, IIoT) are typically small in size, for example, 20-200 bytes.

In an example implementation, the payload size for a given TSC stream/flow may be fixed and/or may be known in advance by the gNB. The gNB may receive the payload size via TSC assistance information (TSCAI) from a core network, e.g., core network 150 of FIG. 1. The TSCAI, for example, may include a flow direction, periodicity, and/or burst arrival time. The flow direction may indicate the direction of TSC flow, e.g., uplink or downlink. The periodicity may indicate the time period between the start of two bursts. The burst arrival time may indicate the arrival time of the data burst at either the ingress of a RAN (e.g., downlink flow direction) or egress interface of the UE (e.g., uplink flow direction).

In a RAN, accurate link adaptation plays an essential role in meeting latency and reliability requirements. In fact, accurate link adaptation becomes more important for TSC due to very short latency budget, e.g., 0.5 ms (and up to 6 nines reliability) which may not allow time for HARQ retransmissions (at least for subcarrier spacing (SCS)≤60 kHz). Further, in DL, link adaptation is generally based on channel quality indicator (CQI) reports which may be periodically or aperiodically reported by the UE. For example, the UE may determine the CQI and may send a CQI report (e.g., corresponding to an MCS index in a pre-defined table) as per the procedure defined in 3GPP TS 38.214, Sec. 5.2.2.1.

In an additional example implementation, the payload size may be estimated by the gNB based on prior transmissions, e.g., prior downlink and/or uplink transmissions. In another additional example implementation, the gNB may estimate the TBS based on a combination of the TBS received from the core network and the TBS estimated by the gNB. In other words, the gNB may adjust the TBS received from the core network based on prior transmissions to determine the TBS to be sent to the UE.

At 220, gNB 202 may send configuration information to UE 204 which may be used by the UE for generating CQI/CQI report. The configuration information may also be referred to as channel quality report configuration in the present disclosure.

In some implementations, for example, the channel quality report configuration received from the gNB may include the TargetTBS described earlier (also referred to as a first TBS in the present disclosure) to determine the CQI for reporting to the gNB.

At 230, UE 204 may receive the channel quality report configuration from the gNB and may configure the UE based on the information in the channel quality report configuration.

In some implementations, for example, the UE may estimate the channel quality at the UE based on at least on the TargetTBS. For example, the UE may estimate the signal quality using reference signals, e.g., channel state information reference signals (CSI-RSs) and based on the TargetTBS configured at the UE. Then the UE, based on the measured signal quality, may determine the highest CQI for which the TargetTBS can be delivered with error probability not exceeding a BLER target. The BLER target, in some implementations, for example, may be explicitly configured at the UE or may be determined based at least on signaled CQI table(s) as defined in 3GPP Specifications.

In some implementations, for example, if the number of required PRBs based on the CQI and the TargetTBS is determined to be smaller than the number of PRBs in the CSI reference resource, the CQI may be determined assuming that the TBS is scheduled on PRBs with poor channel quality of the CSI reference resource or equally separated PRBs or a set of PRBs, or may be up to UE implementation. It should be noted that these are just example implementations, and not limitations.

Further, in some implementations, for example, the UE may determine a plurality of CQIs (at least two CQIs), e.g., a first CQI and a second CQI. The first CQI may be similar to the CQI described earlier which may be determined based at least on the TargetTBS received from the gNB. The second CQI may be determined based on the current 3GPP Specifications, for example, with associated TBS determined from the corresponding CQI index and CSI reference resource.

At 240, UE 204 may generate and/or send a CQI report to gNB 202. In some implementations, for example, the UE may send the CQI report to the gNB, as configured in a CSI-ReportConfig Information Element (IE) and as described in TS 38.331, using a physical uplink control channel (PUCCH) or physical uplink shared channel (PUSCH).

In some implementations, for example, the UE may report a plurality of CQIs (at least two CQIs) to the gNB, e.g., the first CQI and the second CQI. In an example implementation, the first CQI and the second CQI may be reported using 4 bits each. In another example implementation, the first CQI may be encoded differentially with respect to the second CQI. For example, the current CQI report may be extended by 2 bits, where the two additional bits may be mapped to 4 CQI offset values. In other words, the second CQI may be reported as per current 3GPP Specifications, for example, using 4 bits which may map to one of 16 entries of the CQI table. The first CQI may be reported using, for example, 2 bits, which may be mapped to 4 different offset values with respect to the second CQI. In some implementations, for example, the offset values may be defined in the 3GPP Specifications, e.g., an offset value of 00 may mean that 1st CQI=2nd CQI, an offset value of 01 may mean that 1st CQI is one index lower than 2nd CQI, etc.

At 250, gNB 202 may select an MCS. In some implementations, for example, the gNB may select the MCS based at least on the CQI reported by the UE (and wherein the CQI is determined based at least on the TargetTBS sent by the gNB). This ensures that the gNB is selecting the optimal MCS to support TSC and/or URLLC.

In some implementations, for example, the gNB may apply an offset to the CQI reported by the UE in order to, for example, compensate for UE measurement inaccuracies, CQI reporting delays, or other systematic or non-systematic errors affecting the accuracy of the CQI report. In another example implementation, the gNB may apply an offset to CQI reported by the UE when there is a mis-match between the target BLER associated with the CQI report and the desired target BLER of the TB transmission. For example, the CQI report may be associated with a BLER target of 1E-5, but the TB transmission may require a BLER target of 1E-3. These mechanisms are referred to as outer loop link adaptation (OLLA).

At 260, gNB 202 may send a downlink transmission to UE 202. In some implementations, for example, gNB 202 may send a downlink transmission using the MCS determined at the gNB based on, for example, the CQI received from the UE. In an example implementation, gNB 202 may send a physical downlink shared channel (PDSCH) using the MCS determined at the gNB.

Thus, the above described procedures support TSC and/or URLLC by decoupling TBS associated with a CQI report from reference resource allocation size and the reported CQI index (or recommended MCS).

Figure 3:
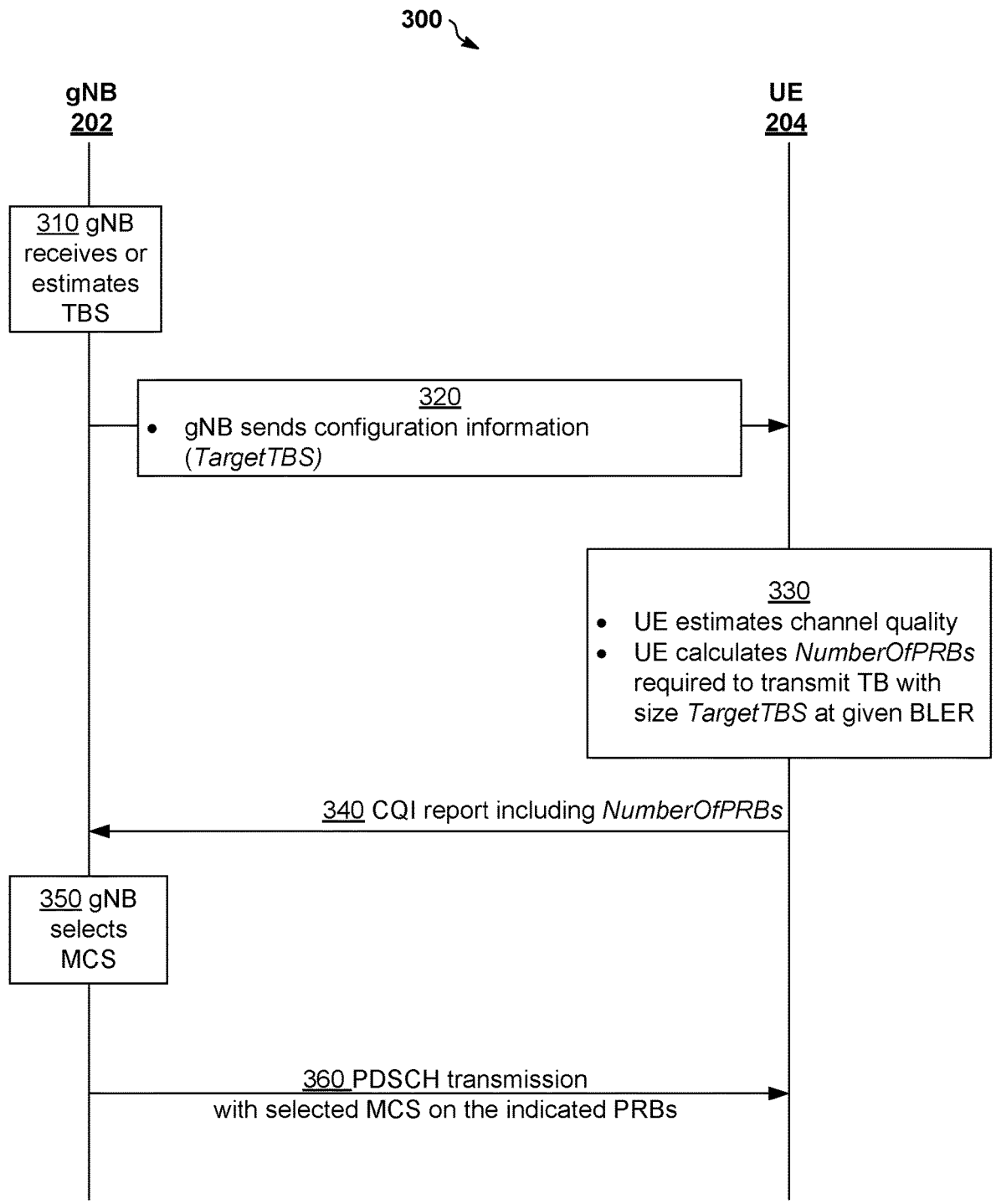

FIG. 3 illustrates a link adaptation mechanism 300, according to an additional example implementation.

In some implementations, for example, instead of a UE reporting a CQI (e.g., an entry to an MCS table) as described earlier in reference to FIG. 2, the UE may report a number of PRBs (e.g., NumberOfPRBs/NumberOfPRBs report) that are required to deliver the TargetTBS to the UE with a given BLER target. The gNB, in order to receive the NumberOfPRBs from the UE, may send additional information to the UE.

In an example implementation, the operations at 310 may be same as or similar to operations at 210 of FIG. 2.

At 320, gNB 202 may send configuration information to UE 204 which may be used by the UE for determining the NumberOfPRBs for reporting to the gNB. In some implementations, for example, the configuration information, which may also be referred to as channel quality report configuration in the present disclosure, may indicate to the UE to determine the NumberOfPRBs such that a given BLER target (for example, for TSC or URLLC) is satisfied for a TargetTBS.

In addition, in some implementations, for example, the channel quality report configuration may further indicate a physical downlink shared channel (PDSCH) time duration to the UE that may be used by the UE for determining the NumberOfPRBs. Furthermore, in some implementations, for example, overhead assumptions may be signalled as well, fixed in the Specification, or derived implicitly based at least on the duration of the PDSCH.

At 330, UE 204 may estimate the experienced signal/channel quality (e.g., SINR) using, for example, existing procedures based on CSI reference signals. Upon determining the signal quality, the UE may determine the number of resources/PRBs (e.g., NumberOfPRBs) for which the TargetTBS may be satisfied with error probability not exceeding the BLER target. In some implementations, the BLER target may be explicitly configured or may be determined based on the signaled CQI table as defined in current 3GPP Specifications.

In addition, in some implementations, for example, to account for frequency variations of the channel quality, the following may be additionally configured (or defined in the 3GPP Specifications) for determining the NumberofPRBs to be reported to the gNB. In an example implementation, the UE may determine the NumberOfPRBs assuming that they are scheduled on PRBs (or group of PRBs) with worst (e.g., lowest) channel quality on a frequency band/sub-band. In an additional example implementation, the UE may determine the NumberOfPRBs assuming that the PRBs are scheduled on PRBs with average quality. In an additional example implementation, the UE may determine the NumberOfPRBs assuming that the PRBs are equally separated in frequency, etc. In an additional example implementation, the UE may determine the NumberOfPRBs assuming that the PRBs (or a set/group of PRBs) are contiguously/sequentially allocated, e.g., starting from a PRB with lower index in the CSI reference resource. In addition, in some implementations, for example, the implementations that provide a deterministic rule (or rules) on how to determine the subset of resources (PRBs) from the CSI reference resource may be preferred (e.g., equally separated PRBs, scheduled on sequential PRBs, etc.) as they may facilitate testability, e.g., it may be tested that if the gNB schedules (e.g., with constant interference and channel conditions) the configured TBS on those PRBs and number of OFDM symbols, the BLER target should be satisfied.

At 340, UE 204 may send a CQI report to gNB 202. In some implementations, for example, the UE may report the NumberOfPRBs to the gNB in a CQI report. In some implementations, for example, the UE may send the CQI report to the gNB, as configured in the CSI-ReportConfig Information Element (IE) and as described in TS 38.331, using a physical uplink control channel (PUCCH) or physical uplink shared channel (PUSCH).

In addition, in some implementations, for example, the UE may report the NumberOfPRBs assuming that they are scheduled on PRBs with worst channel quality on the frequency band/sub-band, average channel quality, equal separation in frequency, contiguous/sequential allocation, or a combination thereof, as described above in reference to 330. In addition, in some implementations, for example, the NumberOfPRBs report may include pointers to different PRB indexes as illustrated in FIG. 4.

At 350, gNB 202 may select an MCS. In some implementations, for example, the gNB may select the MCS based at least on the NumberofPRBs reported by the UE. This may ensure that the gNB is selecting the optimal MCS to support TSC, URLLC, etc.

At 360, gNB 202 may send a downlink transmission to UE 202. In some implementations, for example, gNB 202 may send a downlink transmission using the MCS determined at the gNB based on, for example, the PRBs indicated by the UE. In an example implementation, gNB 202 may send a physical downlink shared channel (PDSCH) using the MCS determined at the gNB.

Figures 4A, 4B:
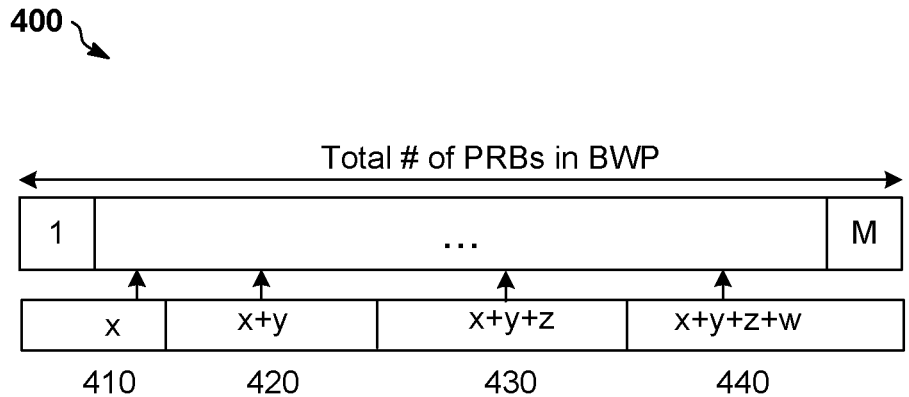
FIG. 4A illustrates a feedback mechanism reporting a number of physical resource blocks (PRBs), according to an example implementation.
FIG. 4B illustrates a table with CQI_PRB_Index pointing to NumberOfPRBs, according to an example implementation.

FIG. 4A illustrates reporting of PRBs 400, according to an example implementation.

In some implementations, for example, the CQI report which may include the NumberOfPRBs may include pointers to different PRB indexes such that "X" PRBs 410 may be required if TBS is scheduled on a first (e.g., beginning) part of the BWP, "Y" PRBs 420 may be required if TBS is scheduled on a second part of the BWP, "Z" PRBs 430 may be required if TBS is scheduled on a third part of the BWP, and/or "W" PRBs 440 may be required if TBS is scheduled on a fourth (e.g., end) part of the BWP. In an example implementation, the gNB, based on the reported NumberOfPRBs, the TargetTBS, and the location of the PRBs, may determine the MCS for DL data scheduling.

FIG. 4B illustrates a table 450 with CQI_PRB_Index pointing to NumberOfPRBs, according to an example implementation.

In some implementations, for example, CQI size may be captured with, for example, a 3-bit or 4-bit word that may indicate the number of PRBs that the UE recommends the gNB use for transmitting a TB with size TargetTBS. An example implementation (e.g., Table) is illustrated in FIG. 4B for a 3-bit word (e.g., values of CQI_PRB_Index from 0 to 7) pointing the recommended number of PRBs, NumberOfPRBs. This may be configurable via higher layer signalling (e.g., RRC) by the network. This may adjust the range of NumberOfPRBs according to the TargetTBS and approximate knowledge of UE channel conditions.

For example, a UE with a TargetTBS of 20 bytes in an indoor factory environment and relative good SINR conditions, the Table illustrated in FIG. 4B may be configured at the UE. However, if the UE is located in a poor RF environment (e.g., hostile macro-cellular environment) with lower SINR footprint and TargetTBS of 500 bytes, the Table illustrated in FIG. 4B may instead be configured with to have higher values for NumberOfPRBs, for example, starting from NumberOfPRBs=10 for CQI_PRB_Index=0 and NumberOfPRBs=100 for CQI_PRB_Index=7. These are example implementations only and not limitations. In some implementations, the Table illustrated in FIG. 4B may be defined in the 3GPP Specifications.

An example implementation is described below.

Set TargetTBS=target TB size configured by gNB for CQI reporting

For each CQI reporting band/subband:
Set CSI_RR to set of PRBs associated to the CQI reporting band/subband
Initialize NumberOfPRBs={ } (empty)←Subset of PRBs for CQI (or NumberOfPRBs) determination
While size(NumberOfPRBs)≤size(CSI_RR):
Add one PRB from CSI_RR to NumberOfPRBs.
From set of PRBs in NumberOfPRBs, determine CQI (e.g., modulation and code rate) and corresponding TransportBlockSize (taking into account duration of the PDSCH, number of symbols for control/DMRS overhead, etc.) that fulfills configured BLER target. See TS 38.214 Sec. 5.1.3.2 for examples on transport block size determination.

Figure 5:
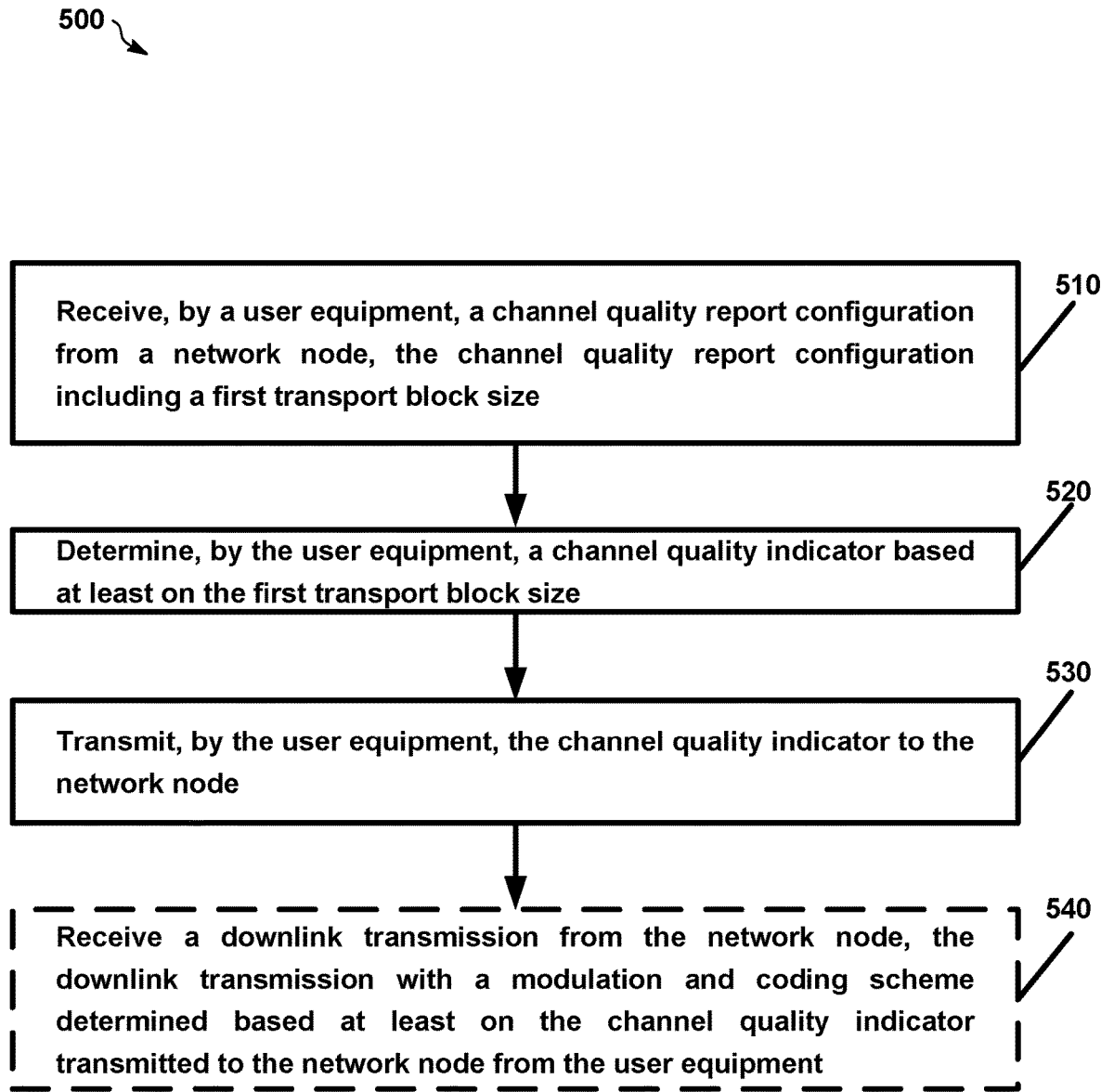
FIGS. 5-6 illustrate flow charts transmitting CQI reports, according to various example implementations.

If TransportBlockSize≥TargetTBS
        Report CQI or size(NumberOfPRBs) depending on implementation
        break FIG. 5 is a flow chart 500 illustrating a link adaptation mechanism, according to an example implementation.

In an example implementation, at block 510, a UE, e.g., UE 204, may receive a channel quality report configuration from a network node, e.g., gNB 202. In some implementations, the channel quality report configuration may include (or indicate) a first transport block size, e.g., a target transport block size (TargetTBS).

At block 520, the UE may determine a CQI based at least on the first transport block size. In some implementations, for example, the CQI may be a highest CQI that satisfies the downlink transmission of the first transport block size with a target BLER.

At block 530, the UE may transmit the CQI to the network node.

Optionally, in some implementations, at block 540, the UE may receive, from the network node, a downlink transmission with an MCS determined based at least on the CQI transmitted to the network node.

Thus, the above described procedures may support TSC and/or URLLC.

Figure 6:
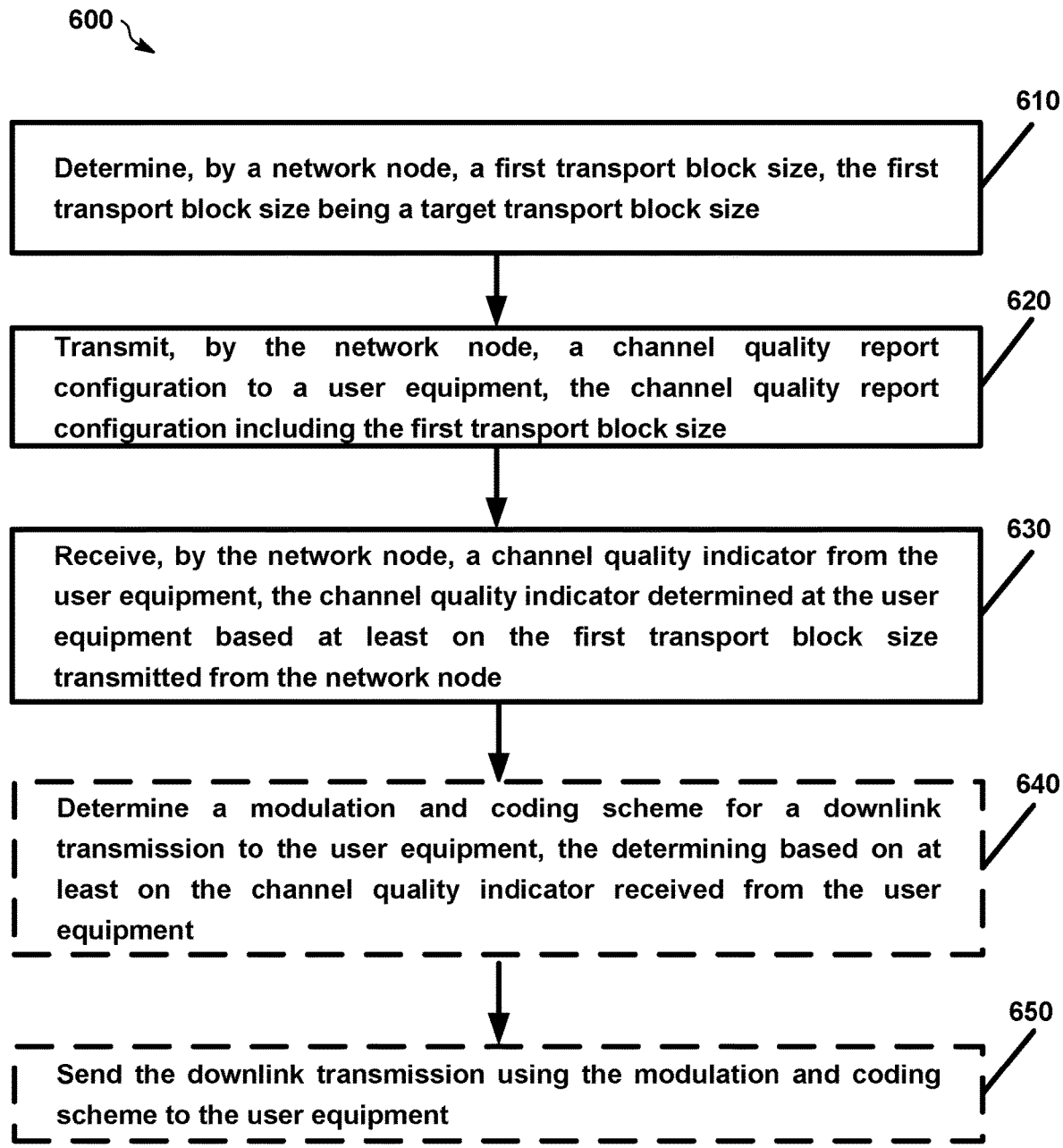

FIG. 6 is a flow chart 600 illustrating a link adaptation mechanism, according to an additional example implementation.

In an example implementation, at block 610, a gNB, e.g., gNB 204 may determine a first transport block size, e.g., TargetTBS. In some implementations, the TargetTBS may be received from a core network or estimated at the gNB based on prior transmissions to/from the UE, e.g., UE 204.

At block 620, the gNB may transmit a channel quality report configuration to the UE. In some implementations, for example, the channel quality report configuration may include the first transport block size, e.g., TargetTBS.

At block 630, the gNB may receive a CQI from the UE. In some implementations, for example, the CQI may be determined at the UE based at least on the TargetTBS transmitted from the gNB.

Optionally, in some implementations, at block 640, the gNB may determine an MCS for a downlink transmission to the UE. In some implementations, the gNB may determine the MCS based on at least on the CQI received from the UE.

Optionally, in some implementations, at block 650, the gNB may send the downlink transmission using the determined MCS to the UE.

Thus, the above described procedures may support TSC and/or URLLC.

In addition, in some implementations, the gNB may reconfigure definition of a CSI reference resource (or re-define) to allow at least a configurable duration (instead of being a fixed to full slot of 14 symbols, as defined in current 3GPP Specifications), e.g., shorter allocation of 2 or 4 symbols which may be more suitable for TSC/URLLC. Further, other parameters which may impact TBS associated with the CSI reference resource may also be modified, for example, number of symbols for control, number of symbols for demodulation reference signal (DMRS), etc. This may provide flexibility such that the TBS associated with a CQI report matches TargetTBS. Furthermore, this implementation may be combined with other example implementations described earlier, for example, where the UE reports the NumberOfPRBs, where the determining of the NumberOfPRBs may be based on gNB-configured definition of a CSI reference resource.

Additional example implementations are described herein.

Example 1. A method of communications, comprising: receiving, by a user equipment, a channel quality report configuration from a network node, the channel quality report configuration including a first transport block size; determining, by the user equipment, a channel quality indicator based at least on the first transport block size; and transmitting, by the user equipment, the channel quality indicator to the network node.

Example 2. The method of Example 1, wherein the first transport block size is a target transport block size.

Example 3. The method of any of Examples 1-2, further comprising: receiving a downlink transmission from the network node, the downlink transmission with a modulation and coding scheme determined based at least on the channel quality indicator transmitted to the network node from the user equipment.

Example 4. The method of any of Examples 1-3, wherein the determining of the channel quality indicator further includes: determining a highest channel quality indicator that satisfies the downlink transmission of the first transport block size with a target block error rate.

Example 5. The method of any of Examples 1-4, wherein the target block error rate is received from the network node or determined by the user equipment based at least on channel quality indicator tables including different sets of modulation and coding rate combinations.

Example 6. The method of any of Examples 1-5, wherein the channel quality indicator includes a first channel indicator and a second quality indicator.

Example 7. The method of any of Examples 1-6, wherein the first channel quality indicator is determined based at least on the first transport block size included in the channel quality report configuration, and wherein the second channel quality indicator is determined based at least on a second transport block size that is associated with a channel state information reference resource.

Example 8. The method of any of Examples 1-7, wherein the transmitting of the channel quality indicator to the network node further includes: transmitting the first channel quality indicator and the second channel quality indicator to the network node.

Example 9. The method of any of Examples 1-8, wherein the first channel quality indicator is encoded differentially relative to the second channel quality indicator.

Example 10. The method of any of Examples 1-3, wherein the channel quality report configuration received from the network node indicates to the user equipment to determine a number of resources required to satisfy a target block error rate for the first transport block size at the equipment.

Example 11. The method of any of Examples 1-3 and 10, further comprising: determining the number of resources that satisfies the target block error rate for the first transport block size at the user equipment.

Example 12. The method of any of Examples 1-3 and 10-11, wherein the resources are physical resource blocks.

Example 13. The method of any of Examples 1-3 and 10-12, wherein the channel quality indicator indicates the number of resources or physical resource blocks.

Example 14. The method of any of Examples 1-3 and 10-13, wherein the receiving the downlink transmission further includes: receiving the downlink transmission from the network node with a modulation and coding scheme that is determined at the network node based at least on the number of resources or physical resource blocks reported by the user equipment and/or the first transport block size.

Example 15. The method of any of Examples 1-14, wherein the channel quality report configuration is received from the network node via a channel state information report configuration information element.

Example 16. A method of communications, comprising: determining, by a network node, a first transport block size, the first transport block size being a target transport block size; transmitting, by the network node, a channel quality report configuration to a user equipment, the channel quality report configuration including the first transport block size; and receiving, by the network node, a channel quality indicator from the user equipment, the channel quality indicator determined at the user equipment based at least on the first transport block size transmitted from the network node.

Example 17. The method of Example 15, further comprising: determining a modulation and coding scheme for a downlink transmission to the user equipment, the determining based on at least on the channel quality indicator received from the user equipment; and sending the downlink transmission using the modulation and coding scheme to the user equipment.

Example 18. The method of any of Examples 16-17, wherein the first transport block size is received from a core network or determined by the network node based at least on prior transmissions to the user equipment.

Example 19. The method of any of Examples 16-18, wherein the first transport block size is received by the network node from the core network via time sensitive communications assistance information.

Example 20. The method of any of Examples 16-19, wherein the channel quality indicator includes a first channel indicator and a second quality indicator.

Example 21. The method of any of Examples 16-20, wherein the first channel quality indicator is encoded differentially relative to the second channel quality indicator.

Example 22. The method of any of Examples 16-20, wherein the channel quality indicator includes a number of resources required to satisfy a target block error rate for the first transport block size at the equipment.

Example 23. The method of any of Examples 1-22, wherein the network node is a gNB.

Example 24. An apparatus comprising means for performing the method of any of Examples 1-23.

Example 25. A non-transitory computer-readable storage medium comprising instructions stored thereon that, when executed by at least one processor, are configured to cause a computing system to perform the method of any of Examples 1-23.

Example 26. An apparatus comprising: at least one processor; and at least one memory including computer program code, the at least one memory and the computer program code configured to, with the at least one processor, cause the apparatus at least to perform the method of any of Examples 1-23.

Figure 7:
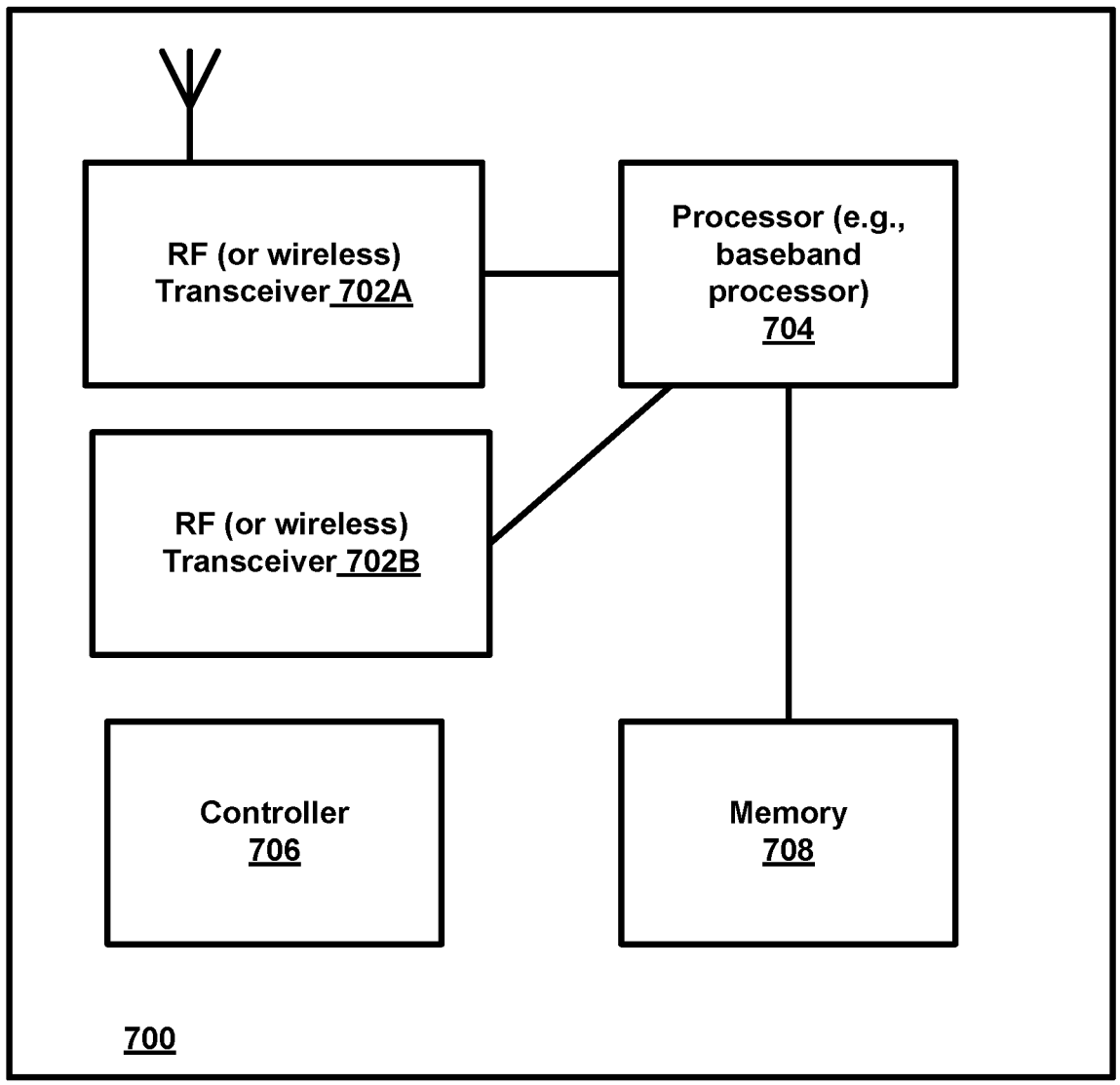
FIG. 7 is a block diagram of a node or wireless station (e.g., base station/access point or mobile station/user device/UE), according to an example implementation.

FIG. 7 is a block diagram of a wireless station (e.g., user equipment (UE)/user device or AP/gNB/MgNB/SgNB) 700 according to an example implementation. The wireless station 700 may include, for example, one or more RF (radio frequency) or wireless transceivers 702A, 702B, where each wireless transceiver includes a transmitter to transmit signals and a receiver to receive signals. The wireless station also includes a processor or control unit/entity (controller) 704/ 706 to execute instructions or software and control transmission and receptions of signals, and a memory 708 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller 706 (or processor 704) may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software. Moreover, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
   receiving, by a user equipment, a channel quality report configuration from a network node, the channel quality report configuration including a first transport block size being a target transport block size;
   estimating a signal quality based on a reference signal and the first transport block size;
   determining, by the user equipment, a channel quality indicator based at least on the first transport block size and the signal quality; and
   transmitting, by the user equipment, the channel quality indicator to the network node.

2. The method of claim 1, further comprising:
   receiving a downlink transmission from the network node, the downlink transmission with a modulation and coding scheme determined based at least on the channel quality indicator transmitted to the network node from the user equipment.

3. The method of claim 1, wherein the determining of the channel quality indicator further includes:
   determining a highest channel quality indicator that satisfies a downlink transmission of the first transport block size with a target block error rate based on the signal quality.

4. The method of claim 1, wherein a target block error rate is received from the network node or determined by the user equipment based at least on channel quality indicator tables including different sets of modulation and coding rate combinations.

5. The method of claim 1, wherein the channel quality indicator includes a first channel indicator and a second quality indicator.

6. The method of claim 1,
   wherein the channel quality indicator is a first channel quality indicator that is determined based at least on the first transport block size included in the channel quality report configuration, and wherein a second channel quality indicator is determined based at least on a second transport block size that is associated with a channel state information reference resource.

7. The method of claim 1, wherein the transmitting of the channel quality indicator to the network node further includes:
transmitting the channel quality indicator as a first channel quality indicator and a second channel quality indicator to the network node.

8. The method of claim 1, wherein the channel quality indicator is a first channel quality indicator that is encoded differentially relative to a second channel quality indicator.

9. The method of claim 1, wherein the channel quality report configuration received from the network node indicates to the user equipment to determine a number of resources required to satisfy a target block error rate for the first transport block size at the user equipment.

10. The method of claim 1, further comprising:
determining a number of resources that satisfies a target block error rate for the first transport block size at the user equipment.

11. The method of claim 1, wherein resources are physical resource blocks.

12. The method of claim 1, wherein the channel quality indicator indicates a number of resources or physical resource blocks.

13. The method of claim 1, wherein the receiving of a downlink transmission includes:
receiving the downlink transmission from the network node with a modulation and coding scheme that is determined at the network node based at least on a number of resources or physical resource blocks reported by the user equipment and/or the first transport block size.

14. The method of claim 1, wherein the channel quality report configuration is received from the network node via a channel state information report configuration information element.

15. An apparatus comprising:
at least one processor; and
at least one memory including computer program code, the at least one memory and the computer program code configured to, with the at least one processor, cause the apparatus at least to:
receive, by a user equipment, a channel quality report configuration from a network node, the channel quality report configuration including a first transport block size being a target transport block size;
estimate a signal quality based on a reference signal and the first transport block size;
determine, by the user equipment, a channel quality indicator based at least on the first transport block size and the signal quality; and
transmit, by the user equipment, the channel quality indicator to the network node.

16. An apparatus comprising:
at least one processor; and
at least one memory including computer program code, the at least one memory and the computer program code configured to, with the at least one processor, cause the apparatus at least to:
determine, by a network node, a first transport block size, the first transport block size being a target transport block size;
transmit, by the network node, a channel quality report configuration to a user equipment, the channel quality report configuration including the first transport block size; and
receive, by the network node, a channel quality indicator from the user equipment, the channel quality indicator determined at the user equipment based at least on the first transport block size transmitted from the network node and a reference signal quality measured by the user equipment.

17. The apparatus of claim 16, wherein the at least one memory and the computer program code are configured to, with the at least one processor, further cause the apparatus to:
determine a modulation and coding scheme for a downlink transmission to the user equipment, the determining based on at least on the channel quality indicator received from the user equipment; and
send the downlink transmission using the modulation and coding scheme to the user equipment.

18. The apparatus of claim 16, wherein the first transport block size is received from a core network or determined by the network node based at least on prior transmissions to the user equipment.

19. The apparatus of claim 16, wherein the first transport block size is received by the network node from a core network via time sensitive communications assistance information.

* * * * *